United States Patent [11] 3,602,910

[72] Inventor Harvey Kofsky
Montreal, Quebec, Canada
[21] Appl. No. 879,815
[22] Filed Nov. 25, 1969
[45] Patented Aug. 31, 1971
[73] Assignee Canadian Marconi Company
Montreal, Quebec, Canada
[32] Priority Oct. 14, 1969
[33] Canada
[31] 064863

[54] CORE MEMORY CIRCUIT

7 Claims, 6 Drawing Figs.

[52] U.S. Cl. ..... 340/174 R, 340/174 TB, 340/173 FF
[51] Int. Cl. ..... G11c 7/00, G11c 11/06
[50] Field of Search ..... 340/174 R, 173 FF

[56] References Cited
UNITED STATES PATENTS
3,418,646 12/1968 Marcus ..... 340/174

*Primary Examiner*—Stanley M. Urynowicz, Jr.
*Attorney*—Fetherstonhaugh and Co.

ABSTRACT: The disclosure teaches a power sensing and control unit for a dynamic, nondestructive memory device which consists of a saturable magnetic core and a flip-flop in parallel connection, and so interconnected that the core is switched only when the power supply for the memory falls to a predetermined level. The information contained in the core is transmitted to the flip-flop on power turn on. Thus, the memory device is dynamic in that the flip-flop may be interrogated, and is nondestructive in that the information is stored in the core on power turn off or loss. The power sensing and control unit consists of several Zener diodes in association with transistors and logic gates, and initiates the information transmission procedures when predetermined power levels are sensed. The invention takes cognizance of the fact that power supplies do not turn on or off instantaneously, but rise or fall to or from zero in a finite time.

INVENTOR
H. KOFSKY

Fetherstonhaugh & Co.
PATENT AGENTS

INVENTOR
H. KOFSKY

Fetherstonhaugh & Co.
PATENT AGENTS

INVENTOR
H. KOFSKY

Fetherstonhaugh & Co.

PATENT AGENTS

INVENTOR
H. KOFSKY

Fetherstonhaugh & Co.
PATENT AGENTS

*INVENTOR*
H. KOFSKY

Fetherstonhaugh & Co.
*PATENT AGENTS*

CORE MEMORY CIRCUIT

This invention relates to an electronic-magnetic dynamic nondestructive memory device. More specifically, thin invention relates to a power sensing and control unit used in association with a novel electronic-magnetic dynamic nondestructive memory device.

It is well known in the art to use a bistable electronic device such as a flip-flop as a memory element. The state of the flip-flop can be altered to store a binary 1 or 0, and the device can be interrogated by reading the voltage ta a preselected one of its output terminals. This device has the advantage of being dynamic, i.e., no interrogation pulse is required in the interrogation thereof, nor is the information contained in the store destroyed in the interrogation thereof. However, some of its disadvantages have made the flip-flop less than desirable as a memory element. Thus, information contained in a flip-flop is lost if the power supply is turned off. Again, power supply transients may inadvertently change the state of the flip-flop to incorrectly alter the stored information.

Another means for storing information which is well known in the art is a saturable magnetic core. If a positive pulse of current of appropriate magnitude is applied to the primary of the unsaturated core, then the core will be saturated in one direction along the well-known hysteresis loop. Applying a second positive pulse to the saturated core will induce a small voltage spike at the secondary (which spike can be made to approach zero if the loop is square enough) of short duration due to the change in magnetic induction as the magnetizing force (proportional to applied current) is varied. However, applying a negative current pulse to the core saturated in the one direction will bring about a relatively large change in magnetic induction, saturating the core in the opposite direction, and inducing a large voltage pulse of duration substantially equal to the duration of the current pulse at the secondary. Information is stored in the saturable core by altering the direction of saturation of the core whereby one direction will represent a binary 1 and the other a binary 0. As the core will remain magnetized independently of any power being supplied to it, the core information will not be destroyed on loss of power. However, a core is a nondynamic device in that an interrogation pulse is necessary to sense its state. Again, a core is a volatile device in that its information may be destroyed when it is interrogated.

A device which attempts to use the advantages of both the core and the flip-flop by incorporating both a core and a flip-flop into a unitary storage element is described in U.S. Pat. No. 3,418,646, Ira R. Marcus. In the Marcus device, information is fed to a saturable core, and then directly to a flip-flop from the core. Thus, during operation, the state of the core will correspond with the state of the flip-flop. On power loss, the information in the flip-flop will be destroyed, but the core information will not be destroyed so that the core, in effect, memorizes the information for retention in the event of power failure. When power is again returned, the flip-flop is designed to automatically assume one state. If this state agrees with the state of the core, then nothing further happens. However, if the state of the core is not the same as the state of the flip-flop, voltages will be induced in the secondaries of the coils in such a direction as to change the state of the flip-flop to correspond to the state of the core.

As can be seen, the above-described device is dynamic in that its flip-flop can be interrogated without the use of an interrogation pulse. The device is nonvolatile because it uses a flip-flop, and it is nondestructive because the flip-flop is paralleled by a saturable core. Nevertheless, the device has many inherent faults, several of which are listed below:

1. Possible oscillations: The circuit assumes that there is no significant voltage output at the secondary when a pulse is applied which would tend to saturate the core in the direction in which it is already saturated. However, as noted above in the discussion on cores, a voltage spike will be produced under these conditions, and it is possible that this spike will be of such a magnitude as to trigger a transistor which should not be triggered. In order to avoid troubles of this nature, slow acting transistors must be used.

Excessive power consumption: Although the core provides useful information only during power turn on, yet power must be consumed throughout system operation to switch the core.

3. Nonstandard components: Because of the way the core is connected to the flip-flop, it is not possible to use sealed, current, off-the-shelf integrated circuits in this network.

It is, therefore, an object of the present invention to provide a novel memory device which incorporates the advantages of both core and flip-flop memory devices, but which is not subject to the above disadvantages, and a power sensing and control unit therefor.

According to the principle of the invention, a memory device is provided comprising a paralleled arrangement of a bistable electronic device such as a flip-flop and a saturable magnetic core so interconnected and controlled that the information of the flip-flop is transmitted to the core only when the magnitude of the memory power supply falls below a predetermined level. This invention takes cognizance of the fact that power supplies do not turn on or off instantaneously, but rise from or fall to zero in a finite time. A capacitor can be placed across the output of any power supply to ensure this type of response.

Preferred embodiments of the invention will be described below with reference to the accompanying drawings in which:

FIG. 1(*a*) is a graph used in the explanation of the operation of the circuit of FIG. 1;

FIG. 3(*a*) is a graph showing outputs at different terminals of the circuit of FIG. 3.

Figure 1:
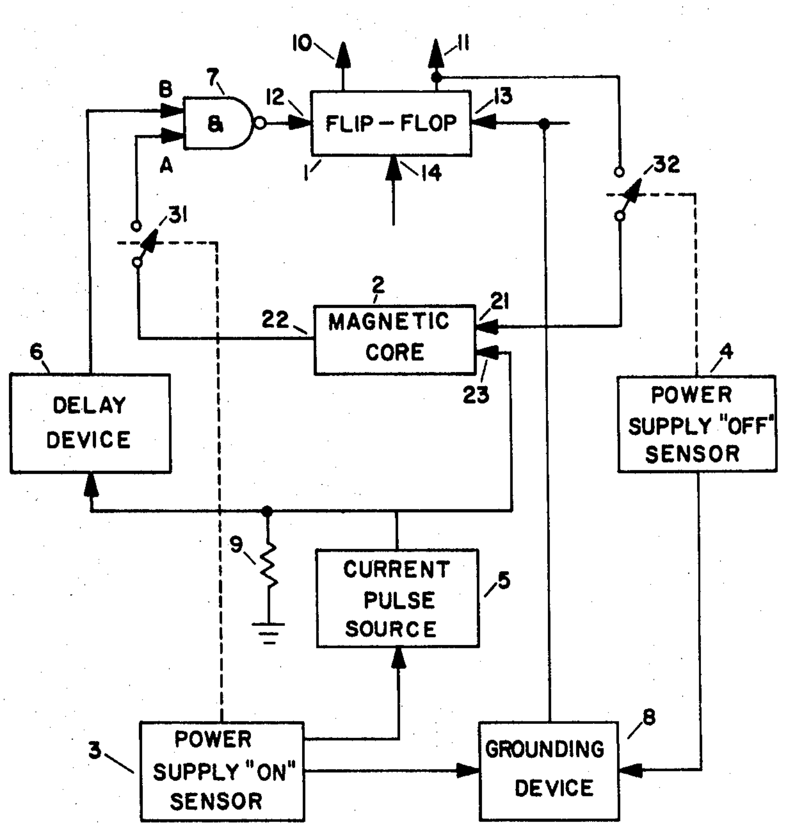
FIG. 1 is a block diagram which illustrates, in principle, how the invention works.
Figure 1A:
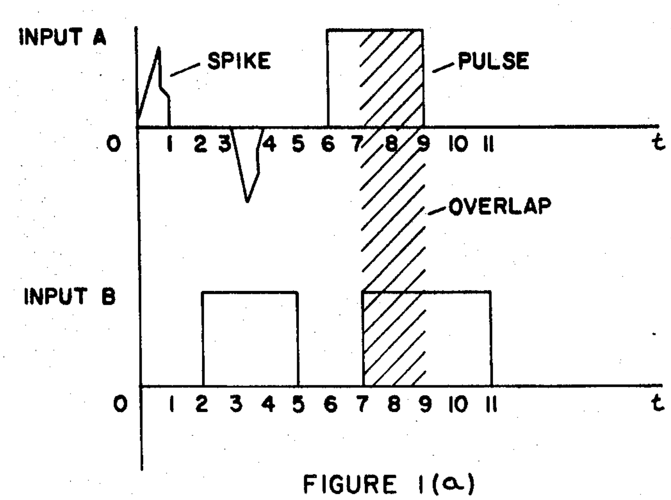

In FIG. 1, 1 is an electronic bistable device such as a flip-flop, having output terminals 10 and 11, SET terminal 12, RESET terminal 13, and clock pulse terminal 14. 2 is a saturable magnetic core having input windings 21 and 23 and an output winding 22. Power supply ON sensor 3 grounds terminal 13, some time after turn on, through grounding device 8 and holds it at ground until the power supply reaches a predetermined first level. When the first predetermined level is reached, on turn on, terminal 13 is released from ground. When the power supply reaches a second predetermined level higher than the first level, on turn on, the power supply ON sensor triggers pulse source 5, which supplies a pulse of current both to input winding 23 of the magnetic core and, in a parallel path, to terminal B of AND gate 7 through delay device 6. Simultaneously, power supply ON sensor 3 actuates means, illustrated symbolically in the drawings as switch 31, for connecting output winding 22 to the A terminal of AND gate 7, the output of which is connected to terminal 12 of the flip-flop.

Power supply OFF sensor 4 senses the shutoff of power and, when the power level falls to the second predetermined level, it actuates means, illustrated in the drawing as switch 32, for connecting output terminal 11 to input winding 21. When the power falls to the first predetermined level, switch 32 is opened and terminal 13 is grounded through grounding device 8.

It is noted that the second predetermined level must be far enough below the operating level of the power supply so that, when the power supply falls back to this level, one can be reasonably certain that either power failure or shutdown is being experienced.

In operation, the system works as follows. Some time after the power is turned on, the power ON sensor actuates the grounding device 8 which momentarily pulls 13 to ground so that terminal 11 is low (it being understood that 1 is a standard integrated circuit-type flip-flop in which the terminal 13 is effectively connected to the righ-hand transistor collector, and that the terminal 11 is directly connected to this collector-terminal). This condition, with terminal 11 low and terminal 10 high, will arbitrarily be selected as the 0 condition of the flip-flop for purposes of our discussion. The terminal 11 is automatically set at a low level at this time because this terminal will normally be connected to the SET terminal of the following stage. As is well known in the art, only a negative change in voltage at the SET terminal will trigger the flip-flop. Thus, with 11 set low, if the state of the flip-flop is altered by the core, 11 will change from a low to a high potential and will not inadvertently trigger the next stage. This particular feature is well known in the prior art, for example the Marcus reference, supra, and does not constitute a feature of the instant invention.

When the first predetermined level is reached, the power supply "ON" sensor closed switches 31 and triggers current pulse source 5 so that it will provide a single pulse of current to the core input 23. The winding 23 is so wound that it will provide a significant voltage output at winding 22 upon application of a pulse only when the core is in a predetermined state—in this example of the 1 state, i.e., the pulse will switch the core to the 0 state. If we ignore, for the moment, the AND gate 7, and assume that 12 is directly connected to 22, it can be seen that, when power is turned on, if the core is in the 1 state, it will provide an output pulse which will trigger the SET terminal and so change the state of the flip-flop to the 1 state. It is noted in this respect that the grounding device 8 must release quickly enough so that it does not counteract this effect. If the core is in the 0 state on power turn on, then no pulse will be applied to the SET terminal, as described below.

The delay device and the AND gate are included to ensure that the flip-flop is not incorrectly triggered by a voltage spike generated when the core is already saturated in the direction that the current pulse would tend to saturate it in. The action of the parallel path can be understood by referring to FIG. 1(*a*). In FIG. 1(*a*), the top curve is a graph of the signal at terminal A of the AND gate against time while the bottom curve is a graph of the signal at terminal B of the AND gate. When a voltage spike is generated at the secondary of the core, ($t$=0 to 1), i.e. when the core is in the 0 state on power turn on, the delay device insures that the signal in its path is delayed long enough so that the signals at B and A do not coincide in time, i.e. the AND gate is not opened and the flip-flop is not triggered. However, when a voltage pulse is generated, i.e. when the core is in the 1 state on power turn on, the signal at A and B overlap in time (at $t$=7 to 9) and during the overlap, the AND gate is opened and a pulse is transmitted to trigger the flip-flop. While an AND gate has been shown in the generalized schematic diagram, it is not necessary to use this specific embodiment, and a different method of accomplishing the seam effect is illustrated in a preferred embodiment as will be seen below.

To understand the operation of the circuit when the power is deliberately turned off, or otherwise lost, it is again pointed out that a power supply, on turnoff of power, does not instantaneously go to zero, but decreases to zero in a finite time.

Power supply OFF sensor 4 will sense this decrease in power, and, at the second predetermined level thereof, will close switch 32. Terminal 11 will provide an output only when it is in a predetermined state—in this example, the 1 state. As the core was saturated in the 0 state at turn on, and the state is not changed during the operation of the device, it is sufficient to leave the core in the 0 state if the flip-flop is in the 0 state on power turn off so that no power need be transmitted from the flip-flop to the core when the flip-flop is in the 0 state on power turn off. If the flip-flop is in the 1 state on power turnoff, then a signal is supplied from terminal 11 to input winding 21 which is so wound that the core will be then switched to the 1 state. When the power level falls back to the first predetermined level, the switch 32 is opened and terminal 11 is grounded.

It can thus be seen that with this arrangement, the core is used only twice during the entire operation, namely on power turn on and turnoff. More specifically, the core is switched and effects the flip-flop on turn on only when it has previously memorized a 1, and the core is switched and is affected by the flip-flop on turn off only when the flip-flop is in a 1 condition on turnoff. Obviously the circuit can be arranged so that the core and flip-flop transmit information only when they are in the zero state providing that arrangements are made to avoid false triggering of further stages. This arrangement thus cuts down on the power requirements as called for by Marcus who switches the core each time he switches the flip-flop. Again, as the core is effectively disconnected from the flip-flop at all times except during turn on and turn off, there is no danger of spurious oscillation. Further, as connections are made only to terminals provided on standard integrated flip-flops, current, off-the-shelf items can be used.

Figure 2:
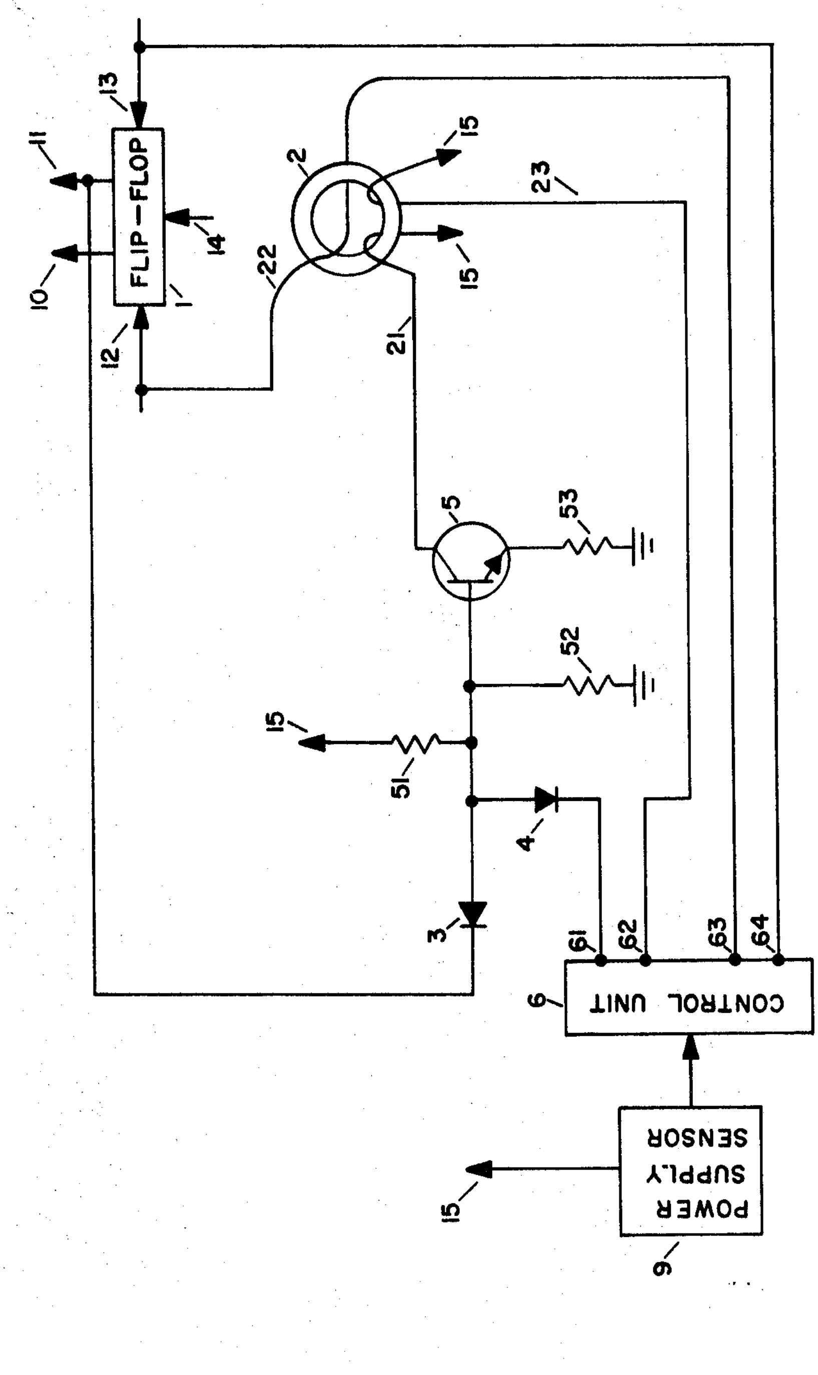
FIG. 2 illustrates a preferred circuit embodying the invention.

FIG. 2 illustrates a preferred circuit embodying the invention. In FIG. 2, 1 is an integrated flip-flop of standard configuration having output terminals 10 and 11, SET terminal 12, RESET terminal 13, and CLOCK pulse terminal 14. 2 is a saturable magnetic core having input windings 21 and 23 and an output winding 22. 9 is a power supply level sensor and 6 is a control network having terminals 61 to 64 whose function will be explained hereinafter as will the functions of transistor 5 and diodes 3 and 4. One embodiment of the power supply level sensor and the various functions of the control network will be described in detail below. 15 represents, in all cases, connections to the positive terminal of the power supply.

In operation, the circuit works as follows under the indicated conditions:

Turn on with the core in the 1 state: Power supply level sensor 9 is programmed to initiate action after it senses a predetermined voltage level.

In this description, the 0 and 1 states are identical to the 0 and 1 states as described with respect to FIG. 1.

Some time after power turn on and until the power supply reaches a first predetermined level, terminal 64 is at ground, so that, on turn on, terminal 11 will be pulled down and the flip-flop will be in its 0 state. Terminal 64 must remain at ground potential long enough to ensure that the flip-flop latches to its 0 state, and, after the first predetermined level is reached, terminal 64 is released from ground. When the power supply reaches a second predetermined level, terminal 62 provides a current pulse which puts the core in its 0 state. Some predetermined time after the onset of the pulse, terminal 63 is connected to a positive potential, and the core now acts as a transformer with winding 23 as the primary and winding 22 as the secondary. It is noted that, prior to the time terminal 63 is connected to the positive potential, it merely hangs loose so that there is no electrical connection between the core and the flip-flop.

When the core is connected to the flip-flop via lead 22, as the core is being changed from its 1 to its 0 state, a voltage will appear at terminal 12 of the correct polarity to change the state of the flip-flop, i.e. from the 0 state it assumed on turn on to its 1 state. Thus, the flip-flop will assume the 1 state which had previously been memorized by the core.

At the termination of this procedure, the core remains in the 0 state.

Turn on with the core in the 0 state: The sequence of events is identical to the above-described. However, with the core in its 0 state, the pulse of current will be effective only to produce a short pulse. As this pulse will be extinguished before the positive potential is applied to terminal 63, no significant signal will be transmitted to terminal 12, and the flip-flop will remain in the 0 state it assumed on turn on, i.e. the same state previously memorized by the core.

It is noted that here once again, the core remains in the 0 state, so that the core, on turn on, will be put into the 0 state, and it will remain in this 0 state, without change and regardless of the state of the flip-flop, during the entire operation prior to power turnoff.

Turnoff with the flip-flop in the 1 state:

When the power supply declines to the second predetermined level, a positive potential is applied from terminal 61 to the cathode of diode 4 so that diode 4 cannot conduct. Also, as the flip-flop is in state 1, a positive potential is applied from terminal 11, to the cathode of diode 3 so that this diode is also cut off. When both diodes are cut off, transistor 5 conducts and collector current flows in lead 21 in such a direction as to change the core to its 1 state. Thus, the state of the flip-flop prior to turnoff is memorized by the core, and the information which would have been lost by the flip-flop when the power turned off is retained by the core.

The positive potential is applied at terminal 61 until the power supply falls back to the first level. At this point, the positive potential is removed and terminal 64 is once again grounded.

Turn off with flip-flop in the 0 state: Again, diode 4 will be cut off, but in the case when the flip-flop is in the 0 state, a low potential is applied at the cathode of diode 3, so that this diode will be conducting. As a result, transistor 5 does not conduct, and core 2 remains in the 0 state, so that once again, the state of the flip-flop prior to turnoff is memorized by the core.

Figure 3:
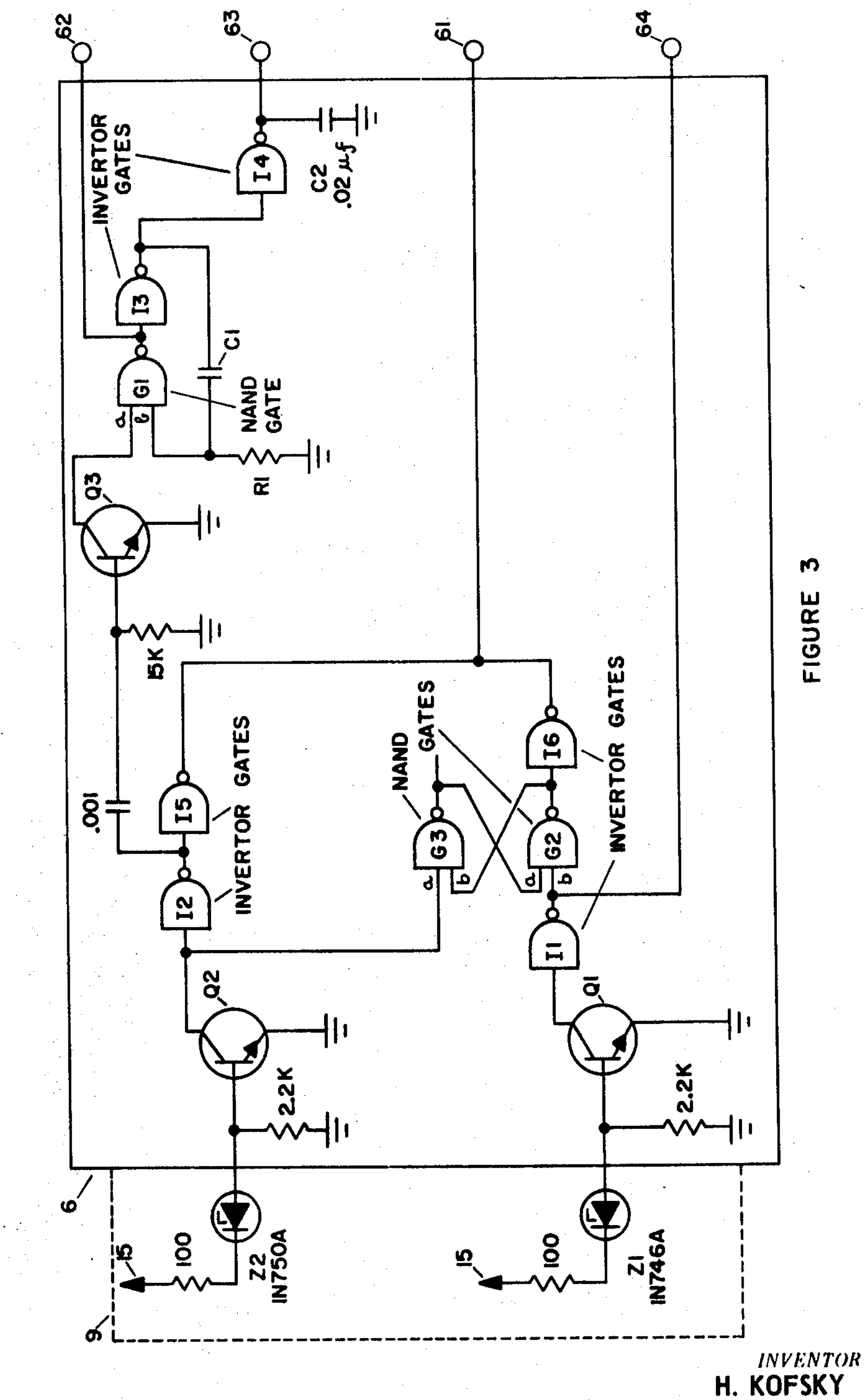
FIG. 3 illustrates a preferred circuit for providing the power sensing and control functions in accordance with the invention.
Figure 3A:
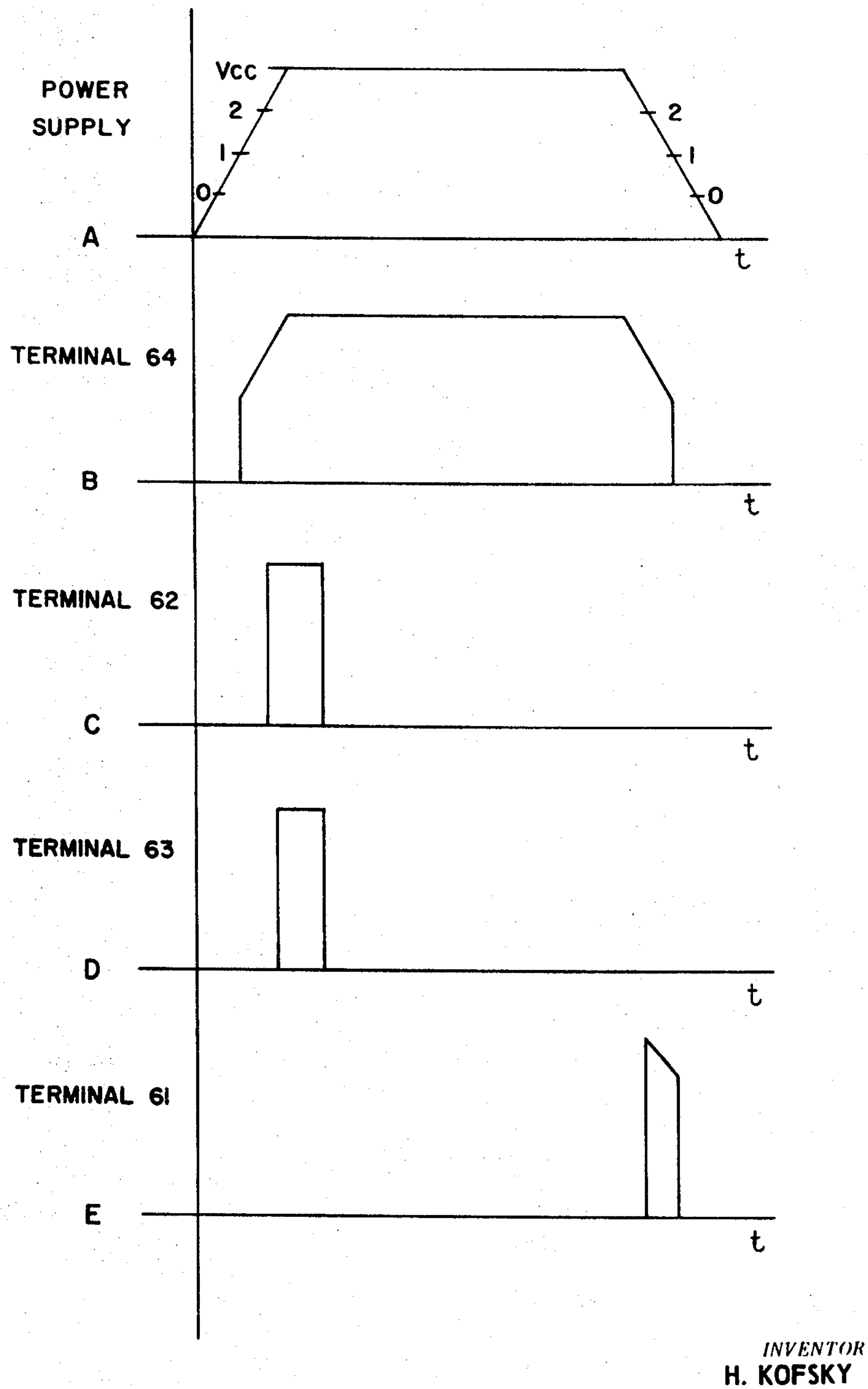

An embodiment of the power level sensor and control circuit is illustrated in FIG. 3. $Z_1$ and $Z_2$ are Zener diodes, $I_1$ to $I_5$ are inverter gates (which may be NAND gates with one terminal unconnected) and $G_1$ to $G_3$ are NAND gates. The Zener diodes are selected such that $Z_1$ begins to conduct before $Z_2$.

The circuit operates as follows: Immediately on power turn on, and until the power supply reaches the level 0 (see FIG. 3(*a*) A) the circuit is in an indeterminate state as there is not enough power to operate the gates. However, when the level 0, which is a function of the characteristics of the gates, is reached, the gates begin to operate and will take on definite states.

When level 0 is reached, both $Z_1$ and $Z_2$ are nonconducting so that $Q_1$ and $Q_2$ are nonconducting and an effective open circuit exists at the collectors of both transistors which are accordingly high. Thus, the outputs of both gates $I_1$ and $I_2$ are low so that terminal 64 is low grounding terminal 13 of flip-flop 1 (FIGS. 1 and 2). At the same time, the output of $I_6$ is low thus grounding terminal 61.

This situation will continue until such time as the power supply voltage, $V_{cc}$, reaches the level 1, (See FIG. 3(*a*) A), i.e. the turn on voltage of Zener $Z_1$. At this point, $Q_1$ begins to conduct so that its collector goes low. As a result, the output of gate $I_1$ rises and terminal 64 is lifted from ground. It is cautioned that level 1 must be enough above 0 so that the gates will have time to latch properly and ground terminal 13 (FIG. 1). It is noted that this change of state of $I_1$ will not affect the output of $I_6$ because input of $G_2$ remains low so that the output of $G_2$ remains high and the output of $I_6$ low.

When $V_{cc}$ reaches level 2 (the turn on voltage of $Z_2$—see FIG. 3(*a*) A), $Q_2$ begins to conduct and its collector falls. This raises the level at the output of $I_2$ causing $Q_3$ to conduct. The effect of this on gate $G_1$ produces a pulsed output at terminal 62. The duration of the pulse is determined by $R_1$ and $C_1$ acting in conjunction with gates $G_1$ and $I_3$. The rise at the output of $G_1$ causes the output of $I_3$ to fall which tends to make the output of $I_4$ high. However, the presence of $C_2$ delays the rise at terminal 63, so that the pulse at the output of terminal 63 is delayed with respect to that at terminal 62. Thus, all of the turn on functions are produced at terminals 62, 63 and 64 with the illustrated circuit, as is illustrated in FIG. 3(*a*), B, C and D.

It is noted that the output at terminal 61 will remain unaltered even when $V_{cc}$ reaches the second level on the way up, so that terminal 61 remains grounded during the entire turn on procedure.

Now, considering the operation of the circuit on turn off, when $V_{cc}$ reaches level 2 on the way down, $Z_2$ stops conducting so that $Q_2$ is turned off and the collector of $Q_2$ goes high. Because of this, $I_2$ goes low and $I_5$ goes high. As $I_6$ is already high, (it goes high when level 2 is reached on turn on) and does not change state when $V_{cc}$ reaches level 2 on the way down, the output at terminal 61 rises to the level of the power supply, and remains there until $V_{cc}$ reaches level 1 (FIG. 3(*a*) E). At that point, $Z_1$ turns off so that $Q_1$ turns off, and its collector goes high. This puts the outputs of both gates $I_1$ and $I_6$ low, so that the output of terminal 61 drops terminating the pulse which had been applied to diode 4 of FIG. 2. At the same time, terminal 64 is grounded, thus preventing flip-flop 1 (FIG. 2) from giving a false signal.

Thus, the functions for turn off are also provided by the illustrated circuit as shown in FIG. 3(*a*) B and E.

Figure 4:
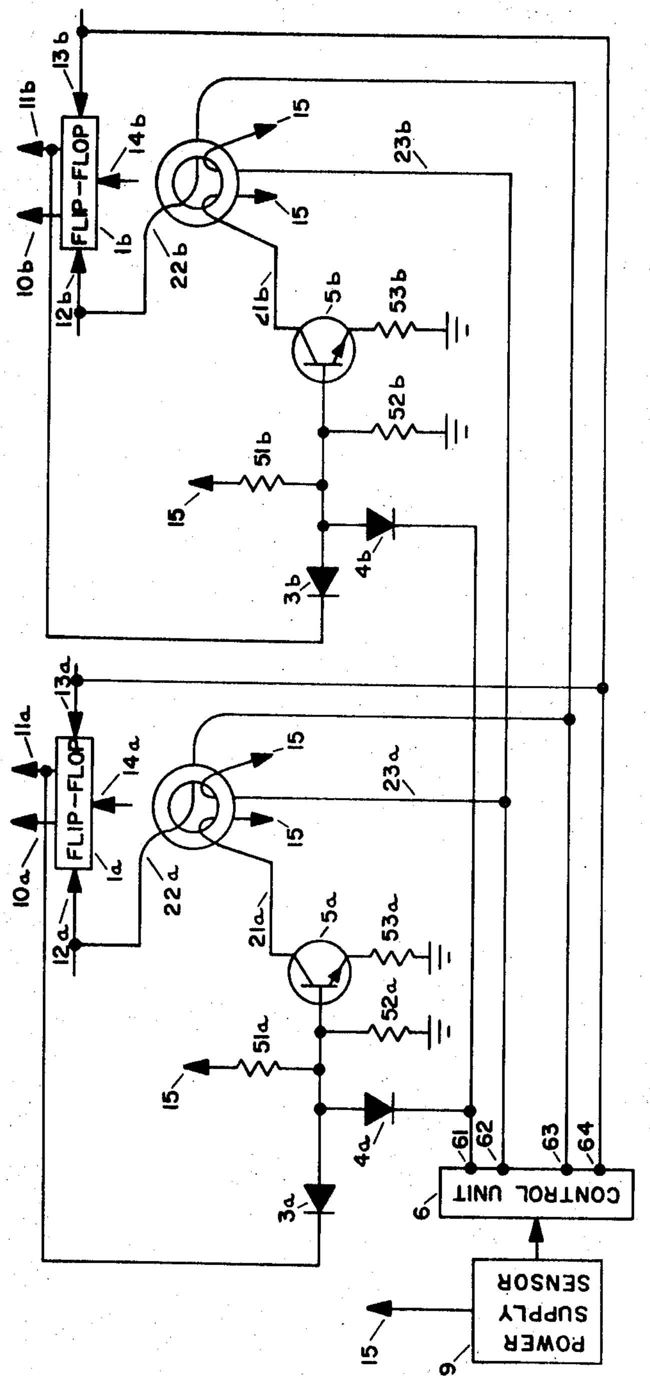
FIG. 4 illustrates how several memory devices can be connected to the same power level sensing and control unit in accordance with the invention.

FIG. 4, which is self explanatory, illustrates how two flip-flops and their associated cores would be connected in the preferred circuit. It is, of course, understood that more than two circuits could be so connected in the same way.

Although several embodiments have been described in the foregoing, it is understood that this was for the purpose of illustrating, but not limiting the invention. Various modifications which will come readily to the mind of one skilled in the art are considered to be withing the scope of the invention.

I claim:

1. For a dynamic, nondestructive memory device comprising; a bistable electronic device having first and second input terminals and corresponding first and second output terminals; and a saturable magnetic core having a first input winding adapted to be connected to said first output terminal, a first output winding adapted to be connected to said second input terminal, and a second input winding; a power supply sensing and control unit comprising; a power supply sensing means for sensing the level of a power supply for said memory device; and control means comprising; means for grounding said first input terminal when said power reaches a first level on power turn on; means, actuated by said sensing means, for releasing said first input terminal from ground when a first predetermined level, higher than said first level, is reached by said power supply; means, actuated by said sensing means, for providing a pulse of energy to said second input winding when a second predetermined level, higher than said first predetermined level, is reached by said power supply; means, actuated by said energy pulse, for electrically connecting said first output winding to said second input terminal, following a fixed delay after the onset of said energy pulse; means, actuated by said sensing means, for connecting means for transmitting the state of said flip-flop to said core when the power supply falls to said second predetermined level on power turnoff, and for disconnecting said transmitting means when the power supply falls to said first predetermined level on power turnoff; means for disconnecting said transmitting means at all other times; and means, actuated by said sensing means, for grounding said first input terminal when said power supply falls to said first predetermined level on power turnoff.

2. A power supply sensing and control unit as defined in claim 1 wherein said power supply sensing comprises a first Zener diode and a second Zener diode; the cathode terminals of said first and second Zener diodes being connected to the positive terminal of said power supply; said first Zener diode being conductive only at and above said first predetermined level; said second Zener diode being conductive only at and above said second predetermined level.

3. A power supply sensing and control unit as defined in claim 2 wherein said means for grounding said first input when said first level is reached on power turn on, and for releasing said first input terminal from ground when said first predetermined level is reached on power turn on; and for grounding said first input terminal when the power supply falls to said first predetermined level on power turnoff, comprises; a first transistor having its base lead connected to the anode of said first Zener diode, and its collector lead connected to the input of a first inverter gate; the output of said first inverter gate being connected to said first input terminal; said first level being the level at which said gate is activated; whereby, when said first level is reached, but said first predetermined level is not reached, on power turn on, said first Zener diode is nonconductive, causing said first transistor to be nonconductive, causing the input to said first inverter gate to be grounded; and whereby, when said first predetermined level is reached on power turn on, said first Zener diode becomes conductive, causing said first transistor to become conductive, causing the input to said first inverter gate to go low, causing the output of said first inverter gate to be lifted from ground; and whereby, when said power supply falls to said first predetermined level on power turnoff, said first Zener diode becomes nonconductive, causing said first transistor to be nonconductive, causing the input to said first inverter gate to be high, causing the output of said first inverter gate to be grounded.

4. A power sensing and control unit as defined in claim 3 wherein said means for providing a pulse of energy to said second input winding when said second predetermined level is reached on power turn on, and for connecting said first output winding to said second input terminal following a fixed delay after the onset of said pulse, comprises; a second transistor having its base lead connected to the anode of said second Zener diode and it collector connected to the input of a second inverter gate; the output of said second inverter gate being connected to the base lead of a third transistor whose collector lead is connected to one input of a first NAND gate, the output of said first NAND gate being connected to the input of a third inverter gate, the output of said first NAND gate being further connected to one end of said second input winding, the other end of said second input winding being connected to the positive terminal of said power supply, the output of said third inverter gate being connected, through a first capacitor, to the second input of said first NAND gate; the junction of said first capacitor and said other input of said first NAND gate being connected, through a first resistor, to ground; the output of said third inverter gate being further connected to the input of a fourth inverter gate; the output of said fourth inverter gate being connected to one end of said first output winding, the other end of said first output winding being connected to said second input terminal; the output of said fourth inverter gate being further connected, through a second capacitor, to ground; whereby, when said second predetermined level is reached on power turn on, said second Zener diode becomes conductive, causing said second transistor to become conductive, causing the input to said second inverter gate to go low, causing the output from said second inverter gate to go high, causing said third transistor to become conductive, causing the input to said first NAND gate to go low, causing the output of said first NAND gate to go high and to thereby provide a pulse of energy to said second input winding, the duration of said pulse being determined by the interaction of said first NAND gate, said third inverter gate, said first resistor and said first capacitor; and whereby when the output of said first NAND gate goes high, the output of said third inverter gate goes low, causing the output of said fourth inverter gate to tend to go high and thereby apply a positive potential to one end of said first output winding, said positive potential being delayed for said fixed delay by the action of said second capacitor.

5. A power sensing and control unit as defined in claim 4 wherein said memory device further comprises; a fourth transistor having its collector lead connected to one end of said first input winding, the other end of said first input winding being connected to the positive potential of said power supply; the base lead of said fourth transistor being connected to the anode terminal of a first and a second diode; the cathode terminal of said first diode being connected to said first output terminal; and wherein the means for connecting the means for transmitting the state of said flip-flop when said power supply falls to said second predetermined level on power turnoff, comprises; said second Zener diode, said second transistor and said second inverter gate; the output of said second inverter gate being connected to the input of a fifth inverter gate; the output of said fifth inverter gate being connected to the cathode lead of said second diode; whereby, when said level falls to said second predetermined level on turnoff, said second Zener diode becomes nonconductive said second transistor to become nonconductive, causing the input to said second inverter gate to go high, causing the output from said second gate to go low, causing the output from said fifth gate to go high, causing said second diode to become nonconductive; and wherein, when said first output terminal is high, said first diode becomes nonconductive, causing said fourth transistor to become conductive; but when said first output terminal is low, said first diode is conductive so that said fourth transistor is nonconductive.

6. A power supply sensing and control unit as defined in claim 5 wherein said means for disconnecting the means for transmitting the state of the flip-flop when said power supply level falls to said first level on turnoff, comprises; said first Zener diode, said first transistor, and said first inverter gate; the output of said first inverter gate being connected to one input of a second NAND gate; the output of said second NAND gate being connected to the input of a sixth inverter gate; the output of said sixth inverter gate being connected to the cathode lead of said second diode; wherein, when the power supply level falls to said first predetermined level on power turnoff, said first Zener diode is nonconductive, causing said first transistor to become nonconductive, causing the input to said first gate to go high, causing the output from said first gate to go low, causing the output from said sixth gate to go low, causing said second diode to become conductive.

7. A power supply sensing and control unit as defined in claim 6 wherein the means for keeping said means for transmitting the state of said flip-flop to said core disconnected at all times subsequent to power turn on, but prior to the time that the power supply level falls to said second predetermined level on turnoff, comprises; said first Zener diode, said first transistor, said first inverter gate, said second NAND gate, said sixth inverter gate, said second Zener diode, said second transistor, said second inverter gate, said fifth inverter gate, and a third NAND gate; the collector of said second transistor being connected to one input of said third NAND gate; the output of said second NAND gate being connected to the other input of said third NAND gate; the output of said third NAND gate being connected to the other input of said second NAND gate; whereby the output of either said fifth inverter gate or said sixth inverter gate is kept low at all times subsequent to power turn on after said first level is reached and until said power supply level.